US011436323B2

(12) United States Patent
Urmanov et al.

(10) Patent No.: US 11,436,323 B2
(45) Date of Patent: Sep. 6, 2022

(54) DETECTING ANOMALIES IN SOFTWARE SERVICE USAGE ACTIVITY

(71) Applicant: Oracle International Corporation, Redwood Shores, CA (US)

(72) Inventors: Aleksey M. Urmanov, San Diego, CA (US); Alan Paul Wood, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 512 days.

(21) Appl. No.: 16/542,067

(22) Filed: Aug. 15, 2019

(65) Prior Publication Data

US 2021/0049270 A1   Feb. 18, 2021

(51) Int. Cl.
*G06F 21/55*   (2013.01)
*G06K 9/62*   (2022.01)
*G06N 20/00*   (2019.01)

(52) U.S. Cl.
CPC .......... *G06F 21/554* (2013.01); *G06F 21/552* (2013.01); *G06K 9/6221* (2013.01); *G06K 9/6257* (2013.01); *G06K 9/6264* (2013.01); *G06N 20/00* (2019.01)

(58) Field of Classification Search
CPC ..... G06F 21/554; G06F 21/552; G06N 20/00; G06K 9/6221; G06K 9/6257; G06K 9/6264
See application file for complete search history.

(56) References Cited

U.S. PATENT DOCUMENTS

| 7,783,510 | B1 * | 8/2010 | Gilgur .............. G06Q 10/06315 |
| | | | 705/7.31 |
| 9,147,167 | B2 | 9/2015 | Urmanov et al. |
| 9,514,213 | B2 | 12/2016 | Wood et al. |
| 10,165,005 | B2 | 12/2018 | Urmanov et al. |
| 10,552,739 | B1 * | 2/2020 | Rausch .............. H04L 67/1097 |
| 10,943,235 | B2 * | 3/2021 | Kolotinsky ........ G06Q 20/1085 |

(Continued)

OTHER PUBLICATIONS

Google Scholar NPL (Year: 2022).*

(Continued)

*Primary Examiner* — Syed A Zaidi
(74) *Attorney, Agent, or Firm* — Park, Vaughan, Fleming & Dowler LLP

(57) ABSTRACT

During operation, the system obtains a training dataset during a training mode, wherein the training dataset includes counts of actions performed by users while operating applications in the computer system. Next, the system uses the training dataset to produce corresponding per-action datasets. The system then cleanses the training dataset based on counts of actions in the per-action datasets to produce a cleansed training dataset, and uses the cleansed training dataset to produce corresponding per-user datasets. Next, the system trains per-user models based on the per-user datasets to detect anomalous actions of users. The system then obtains a surveillance dataset during a surveillance mode, wherein the surveillance dataset includes counts of actions performed by users while operating applications in the computer system. Next, the system uses the trained per-user models to detect anomalous actions in the surveillance dataset. Finally, when an anomalous action is detected, the system triggers an alert.

20 Claims, 9 Drawing Sheets

(56) References Cited

U.S. PATENT DOCUMENTS

| | | | |
|---|---|---|---|
| 11,238,367 B1* | 2/2022 | Liu | G06N 3/0454 |
| 11,310,257 B2* | 4/2022 | Argoeti | H04L 63/1408 |
| 2015/0067845 A1* | 3/2015 | Chari | G06F 21/50 |
| | | | 726/23 |
| 2015/0254555 A1* | 9/2015 | Williams, Jr. | G06N 3/084 |
| | | | 706/14 |
| 2017/0061322 A1* | 3/2017 | Chari | H04L 63/1425 |
| 2018/0083833 A1* | 3/2018 | Zoll | G06N 20/20 |
| 2019/0364088 A1* | 11/2019 | Fu | H04L 43/067 |
| 2020/0274894 A1* | 8/2020 | Argoeti | G06F 7/556 |
| 2020/0358819 A1* | 11/2020 | Bowditch | G06K 9/6267 |

OTHER PUBLICATIONS

NPL Search Terms (Year: 2022).*
Lane, Terran, and Carla E. Bradley. "An application of machine learning to anomaly detection." Proceedings of the 20th national information systems security conference. vol. 377. Baltimore, USA, 1997 (Year: 1997).*
Damopoulos, Dimitrios, et al. "Evaluation of anomaly-based IDS for mobile devices using machine learning classifiers." Security and Communication Networks 5.1 (2012): 3-14 (Year: 2012).*

* cited by examiner counts1=13,14,5,7,12,6,12,10,7,11,7,12,7,5,10,14,7,11,10,5,2,1,12,6,9,8,12,9,6,8,11,11,12,7,12,3,13,8,5,11,7,5,7,11,4,8,9,6,9,6,10,7,6,6,6,9,6,4,12,12,10,5,8,7,10,6,9,7,6,9,13,5,6,6,6,9,5,10,7,7,7,6,2,9,9,8,3,7,7,5,13,7,10,4,9,10,6,1,5,5,10,4,14,6,11,6,4,7,2,9,10,14,10,1,0,3,10,16,7,10,8,10,12,12,3,6,9,8,6,6,7,10,12,7,5,5,8,10,10,4,9,7,12,3,12,7,7,7,7,2,15,8,12,7,15,7

FIG. 4A lambdas=13,8,4,9,8,3,8,7,13,12,4,8,9,5,9,5,6,6,7,5,6,6,5,8,9,5,13,11,11,8,7,6,7,9,9,9,7,9,10,6,15,11,7,6,10,4,11,8,6,5,5,6,2,13,9,9,7,5,8,15,4,4,13,7,17,7,10,10,12,5,9,8,5,3,5,7,5,4,6,6,10,10,5,6,8,8,9,6,7,10,8,7,6,3,11,6,6,6,8,5,11,4,8,8,6,6,7,6,9,8,6,3,8,9,7,16,9,3,11,5,8,5,8,4,8,7,10,2,10,8,8,6,9,4,8,8,9,9,4,6,6,5,3,6,13,7,7,6,8,9,4,6,3,8,7,5,6,6,5,11,9,8,6,8,8,3,4,5,11,5,8,7,10,5,10,7,15,7,5,6,8,6,5,8,3,8,5,7,7

FIG. 4B counts2=14,6,4,9,11,4,10,7,13,3,5,10,11,6,11,7,8,7,10,5,5,9,6,7,12,13,5,12,7,8,9,6,5,3,6,10,8,6,8,10,8,25,17,8,9,10,3,9,6,13,11,7,6,9,6,2,6,5,12,8,6,12,6,5,13,20,2,5,14,3,17,9,10,12,10,11,16,7,8,1,7,10,2,6,4,4,13,8,2,8,12,3,9,7,10,7,3,3,6,7,15,9,5,16,7,5,2,5,14,2,9,5,8,10,2,6,7,4,13,4,6,4,2,7,7,11,7,3,13,4,8,3,4,5,6,8,16,3,8,5,4,5,7,7,7,10,12,4,3,8,5,3,4,7,15,2,7,10,9,5,2,8,1,4,7,5,5,4,6,9,12,11,7,11,7,13,2,3,4,12,5,9,8,4,8,4,17,8,7,5,6,5,8,7,6,1,10,13

FIG. 4C

DETECTING ANOMALIES IN SOFTWARE SERVICE USAGE ACTIVITY

BACKGROUND

Field

The disclosed embodiments generally relate to techniques for protecting against malicious users during operation of a computer system. More specifically, the disclosed embodiments relate to a technique that continually monitors actions of users while interacting with software services to detect anomalies in software service usage activity.

Related Art

The problem of identifying anomalies in the service usage activity of online users has been addressed in several ways by the information technology (IT) industry. Anomalies in such usage data may indicate a potential misuse of an account, or other ongoing malicious or fraudulent activities, which can be as diverse as gaining unauthorized access, attempting an account takeover, launching phishing campaigns, creating fake accounts, validating stolen credit cards, malicious marketing and advertisement, attempting to infect computers and use them in denial-of-service attacks, and various other hacking activities.

One way the industry is defending against such threats is by detecting known threat signatures in the data, which have been previously related to specific types of attacks or malicious activity. If such a signature is detected, it is indicative of an ongoing attack or malicious activity and a remedial action is taken. This approach is effective against known types of attacks and is widespread in traditional anti-virus and anti-malware programs and security tools. It can also be used in an offline mode to identify malicious code fragments or in real-time to identify known attack signatures in network packets.

Another approach is to learn normal patterns in the data in a controlled environment and to deploy an anomaly-detection system that flags everything that does not match the learned normal patterns. In recent years, this approach has gained much attention due to rapid progress in machine learning (ML) and artificial intelligence (AI) technologies and the availability of scalable computational platforms to enable cloud-scale building and operation of ML models. This approach facilitates the detection of new and previously unseen types of attacks, which would have remained unnoticed by security software that only detects known signatures.

One challenging aspect of using ML to detect security threats is the need for training data that is free of attacks or other malicious or anomalous activity. Attack-free training data is required to learn patterns of normal operation. However, it is very hard to find or prepare such a training dataset for a realistic deployment. For example, in cloud-computing systems, it is not unusual that within just a few minutes of deploying a new service and publishing its APIs endpoints, the new service gets attacked, preventing any possibility of collecting a clean, attack-free dataset. If an ML model is built using such a training dataset, which includes anomalous activities, the ML model would learn the anomalous activities as being normal, and would not be able to recognize such anomalies when deployed to monitor new data.

An additional challenge is the limited applicability of ML models learned on one instance of a deployed service to detect anomalies on another instance of the same service because the user base of the two instances may be very different. Thus, normal patterns of user activity for one instance may look anomalous compared to the normal patterns of user activity on the other instance. Hence, it is typically ineffective to collect a training dataset for one instance in a controlled environment, and then use it to detect anomalies for another instance in an operational environment.

These challenges have driven the developers of ML-based security systems to use training data gathered from real operational environments. To prevent ML models from learning anomalous activity that might be present in this real training data, the training data can be screened, and suspicious data points can be removed.

The methods for detecting anomalies in the training data vary depending on the specifics of the application domain and the data. However, one commonality in the training data is that it is unlabeled—there is no indication of which training data points represent normal activity, and which data points are associated with anomalous activity. Therefore, unsupervised methods must be used to detect anomalies in the training data.

In existing systems, the standard assumption is that most of the training data points follow a specific, hypothesized model (for example, a Gaussian distribution), and the points that stand out in comparison to that model are anomalies. Parametric models such as Gaussian or Gaussian mixture, or non-parametric models such as nearest-neighbor or k-nearest-neighbors can be used to detect outliers in training data. However, because the models are fitted using all training points, they may not reliably detect true outliers.

One possible refinement is to leave out one point at a time, fit a model on the remaining points, and then test the left-out point to determine if it is an anomaly. Unfortunately, this refinement is not practical for large-scale deployments that may have millions of training points in one dataset and tens and hundreds of thousands of different datasets. Also, if the number of true outliers is substantial enough to affect the model fit, one needs to leave out a group of points. The number of possible combinations of such points to leave out rapidly explodes, making the approach even less feasible.

Hence, what is needed is a new technique for anomaly detection that facilitates quick, unsupervised identification of anomalies in training datasets.

SUMMARY

The disclosed embodiments provide a system that detects anomalous actions of users while operating applications in a computer system. During operation, the system obtains a training dataset during a training mode, wherein the training dataset includes counts of actions performed by users while operating applications in the computer system. Next, the system uses the training dataset to produce corresponding per-action datasets. The system then cleanses the training dataset based on counts of actions in the per-action datasets to produce a cleansed training dataset, and uses the cleansed training dataset to produce corresponding per-user datasets. Next, the system trains per-user models based on the per-user datasets to detect anomalous actions of users. The system then obtains a surveillance dataset during a surveillance mode, wherein the surveillance dataset includes counts of actions performed by users while operating applications in the computer system. Next, the system uses the trained per-user models to detect anomalous actions in the surveillance dataset. Finally, when an anomalous action is detected, the system triggers an alert.

In some embodiments, while cleansing the training dataset based on the counts of actions in the per-action datasets, the system first clusters the per-action datasets based on counts of actions to produce a set of clusters. Next, the system identifies singleton and rare clusters in the set of clusters, wherein other clusters are normal clusters. The system then fits a mixed Poisson distribution (MPD) into each normal cluster $MPD_1, \ldots, MPD_k$ in the set of clusters. Next, the system tests all singleton and rare clusters based on a percentile threshold for each fitted $MPD_i$. The system then identifies actions associated with singleton and rare clusters having counts greater than the percentile threshold for all $MPD_i$s as anomalous. Finally, the system removes the identified anomalous actions from the training dataset to produce the cleansed training data.

In some embodiments, when an anomalous action is detected, the system performs a remedial action, which can include one or more of the following: informing a system administrator about the anomaly and providing contextual information; scheduling execution of diagnostics and/or security scanning applications for affected parts of the computer system; suspending associated users and/or applications; and enforcing multi-factor authentication for associated users and/or applications.

In some embodiments, the computer system comprises a cloud-computing infrastructure, which hosts applications for various tenants.

In some embodiments, while triggering the alert, the system sends a notification to an associated tenant.

In some embodiments, the system performs the detection for a specific application instance and a specific tenant.

In some embodiments, while obtaining the training data, the system gathers and aggregates the training data from various logs within the computer system.

In some embodiments, the counts of actions comprise counts of actions over fixed time intervals.

BRIEF DESCRIPTION OF THE FIGURES

FIG. 4A illustrates values generated based on a simple Poisson distribution in accordance with the disclosed embodiments.

FIG. 4B illustrates λ values generated based on a Gamma distribution in accordance with the disclosed embodiments.

FIG. 4C illustrates values generated based on a mixed Poisson distribution (MPD) by using the λ values generated from the Gamma distribution in accordance with the disclosed embodiments.

DETAILED DESCRIPTION

Figure 1:
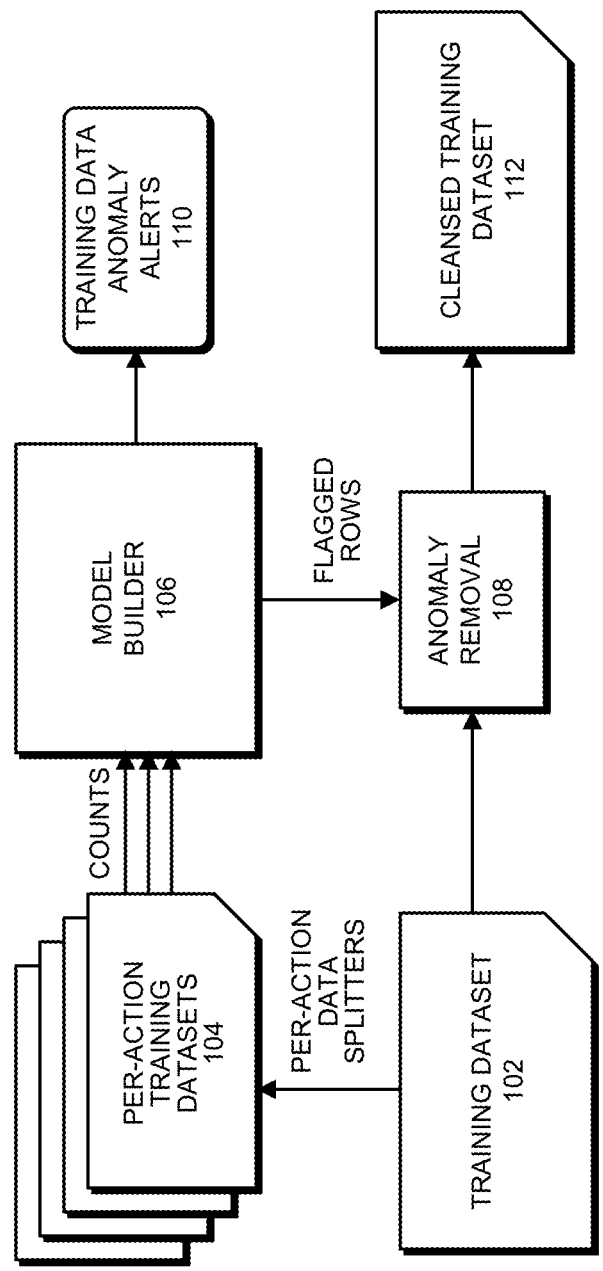
FIG. 1 illustrates an exemplary system for removing anomalous application-related actions of users from training data in accordance with the disclosed embodiments.

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Discussion

The following description covers arbitrary data types; however, for clarity of description we will assume a use case in which the data are received in the form of counts of events (actions) performed by users. Note that for every tenant and application instance in the system, data that represent service (application) usage activity are received. The data contain information about a user, an action that the user performed, and the number of times the action was performed by the user in a specified time period. The received data could include the times that the user performed the action instead of just count data, which allows more detailed user behavior models to be created. (This is described in U.S. Pat. No. 10,165,005, entitled "System and Method Providing Data-Driven User Authentication Misuse Detection" by the same inventors as the current application, filed on Sep. 16, 2016, which is hereby incorporated herein by reference.) During operation, the system parses the data and builds two types of datasets: one for creating per-user activity models; and one for creating per-action activity models. The per-user models are used to learn normal patterns of user activity and to flag any anomalous user activity. The per-action models are used to detect anomalies in the training data.

Anomalies found in the training data are removed from the data before building per-user activity models. Optionally, the training data anomalies are reported to the security alert generation subsystem.

FIG. 1 illustrates an exemplary anomaly-removal system 100 for removing anomalous user application-related actions from training data in accordance with the disclosed embodiments. As illustrated in FIG. 1, a training dataset 102 is reformatted using per-action data splitters to form per-action training datasets 104, which feed associated counts into model builder 106. Model builder 106 then uses these counts to flag specific rows containing anomalous data. The identified anomalous data then feeds into an anomaly removal subsystem 108, which removes anomalous data from the training dataset to produce a cleansed training dataset 112. Model builder 106 also generates training data anomaly alerts 110, which can be sent to a system administrator.

Figure 2:
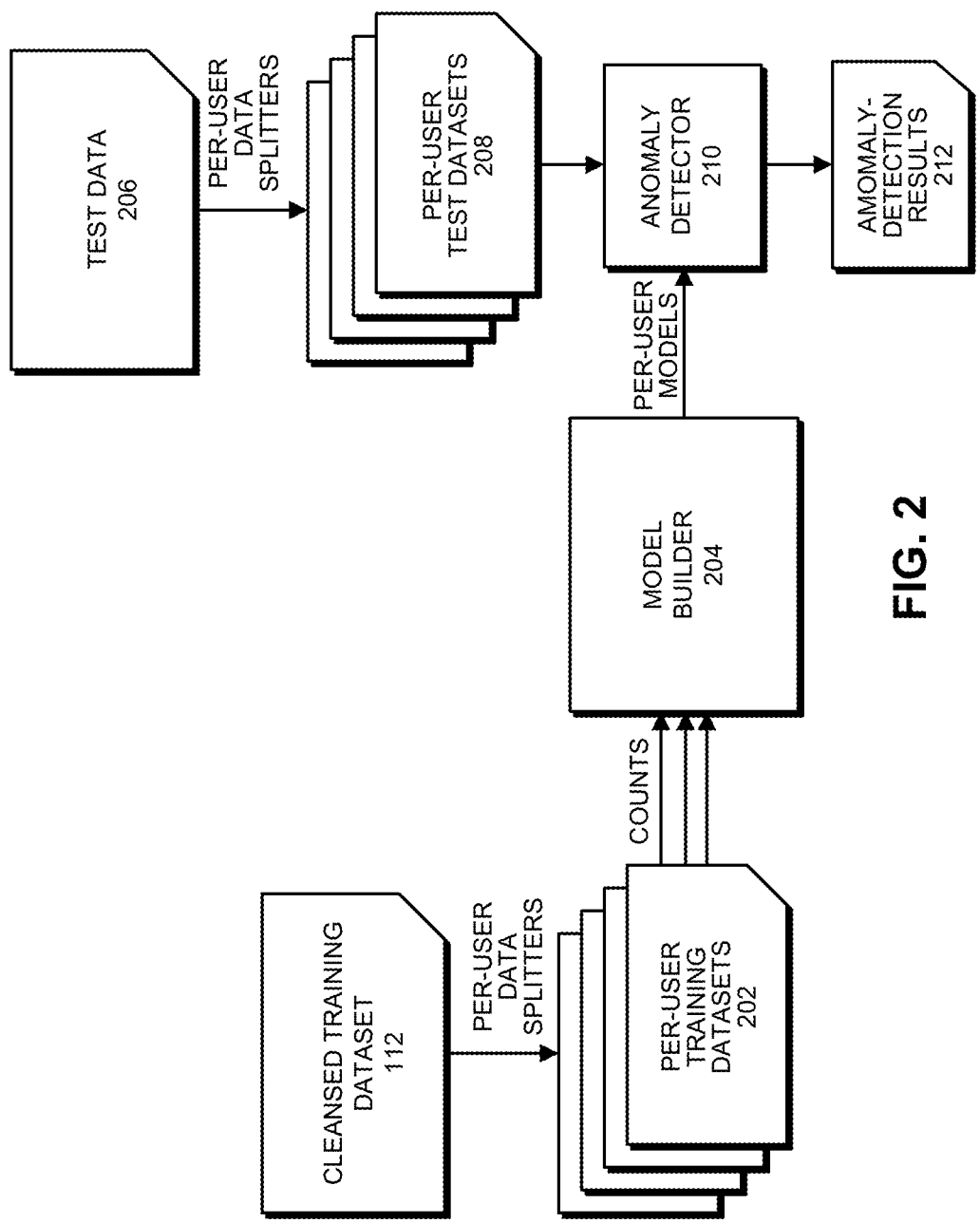
FIG. 2 illustrates an exemplary system for detecting anomalous application-related actions of users in test data in accordance with the disclosed embodiments.

FIG. 2 illustrates how the cleansed training data can be used to detect anomalies. First, the cleansed training dataset 112 feeds through per-user data splitters to form per-user training datasets 202, which feed associated counts into model builder 204. Next, model builder 204 uses these counts to train per-user models, which feed into anomaly detector 210. Next, test data 206 obtained from a computer system under surveillance feeds through per-user data splitters to form per-user test datasets 208, which feed into anomaly detector 210. Anomaly detector 210 then applies per-user models to the per-user test datasets 208 to produce anomaly-detection results 212. Note that both the per-action and per-user activity models are created in model builder 106.

Figure 3:
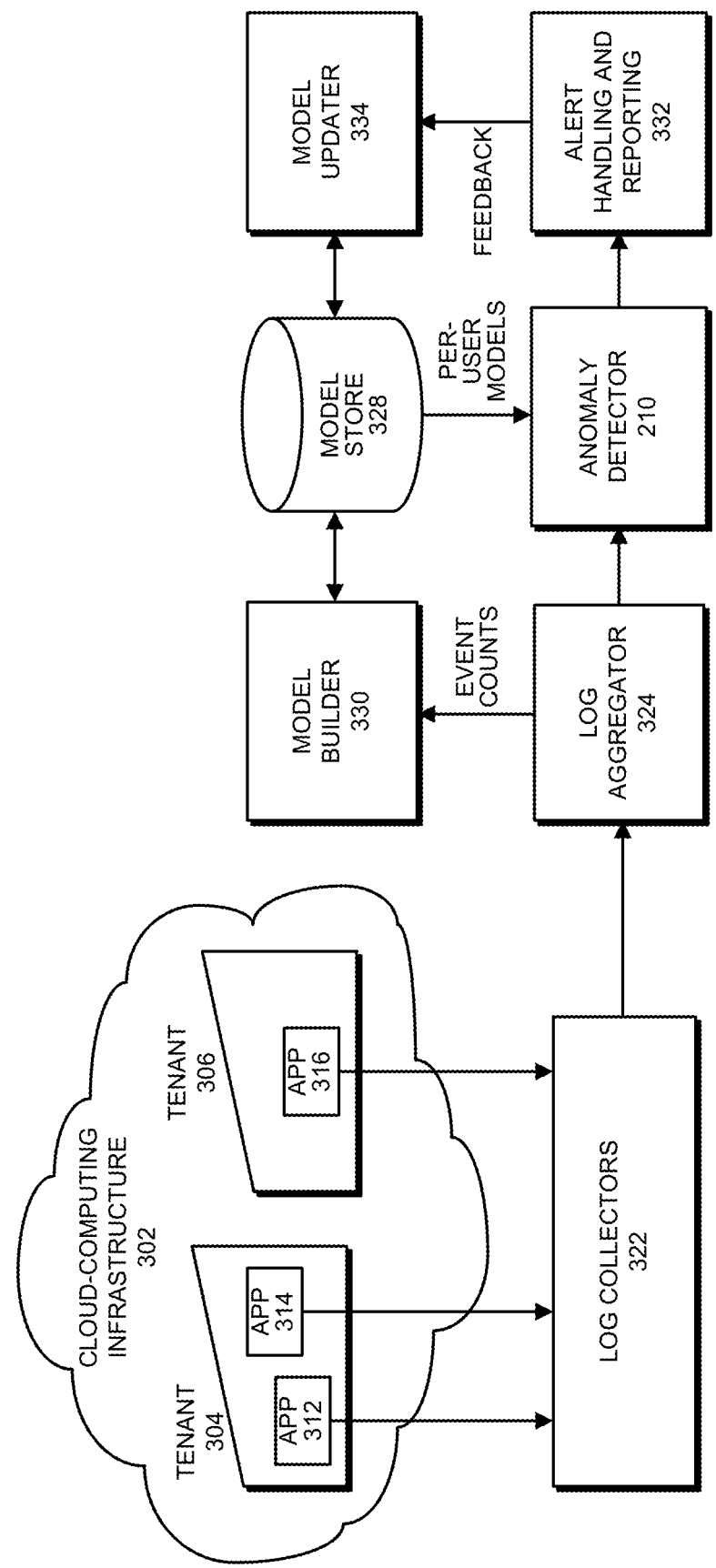
FIG. 3 illustrates an exemplary system for filtering training data and detecting anomalous user actions in accordance with the disclosed embodiments.

An exemplary system incorporating this technique is shown in FIG. 3. As illustrated in FIG. 3, a cloud-computing infrastructure 302 provides computing resources for tenants 304 and 306, wherein tenant 304 hosts application instances 312 and 314 and tenant 306 hosts application instance 316. During execution of application instances 312, 314 and 316, log data describing actions performed by users is collected by log collectors 322 and is aggregated by log aggregator 324. This aggregated log data, which includes associated event (action) counts, feeds into model builder 330, which uses the event counts to generate per-user models, which are stored in model store 328. (Note that model store 328 can be located in a memory, a file system, a HDFS, a NoSQL database, or a RDBMS).

The learned per-user activity models are then used by an anomaly detector 210 to detect anomalous activity in the new (test) data. Anomaly detector 210 then reports detected anomalies to an alert handling and reporting subsystem 332. Also, a model updater 334 uses feedback received from alert handling and reporting subsystem 332 (e.g., false alarms, missed alarms, etc.) to update the per-user activity models in model store 328.

Training Data Anomaly Detection

The detection of anomalies in the training data for per-user activity models is performed by creating per-action activity models, which model the normal activity for a specific action by all users of an application instance. The creation of per-action activity models is based on a priori information about the probabilistic nature of action count data representing the aggregated activity of many diverse users.

Two main steps are involved in detecting anomalies in unlabeled training data. The first is finding potential anomalies by clustering. The reason for this step is to remove potential anomalies that could cause a distribution to fit poorly and be unable to distinguish the anomalies. It also groups the data into clusters for which separate models can be created, which produces better fits than using a single model across all the data. The second is finding anomalies in each cluster using a mixed Poisson distribution (MPD), and then determining if there exist points in or out of the clusters that should be considered outliers. The second step is described first because it motivates the first step.

Finding Anomalies Using a Mixed Poisson Distribution

Consider a specific action A. This action can involve a login, opening an email box, moving a file, creating a folder, sending a message, creating a role, etc. Typically there are dozens to thousands of distinct actions that a user can perform depending on the application and user permissions. (Note that administrators can perform many more actions than the normal user.) Moreover, there exist multiple tenants T, wherein each tenant runs multiple instances of various applications. A per-action activity model captures the activity of all users of a single application instance for that specific action.

Let $X_1, X_2, \ldots, X_n$ represent the counts of action A for n distinct users in a time period, wherein there exists only one data point per user in this dataset. Moreover, we assume that each user has his or her own activity pattern. A common universal assumption is that the counts of actions (events) follow a Poisson distribution, i.e. $X_i \sim \text{Poisson}(\lambda_i)$ with an unknown parameter $\lambda_i$. Another common assumption is that the $X_i$s are independent. Although some users' actions may be correlated, it is safe to assume that the majority of $X_i$s are mutually independent for a large user base of an application, and a small fraction of correlated counts will not affect the results significantly. The "global" or "seasonal" correlations, such as almost all users check their email in the morning, are captured in the count model itself by the rate parameter and by having different models for a different time of day, day of the week, etc., if such data is provided.

With these assumptions, the counts $X_1, X_2, \ldots, X_n$ are modeled as independent random variables with each $X_i$ having a Poisson distribution with an unknown parameter $\lambda_i$. A quick test to see if $X_1, X_2, \ldots, X_n$ may follow the same Poisson($\lambda$) distribution is to compute sample estimates of the mean E(X) and Var(X), which should be the same for a Poisson($\lambda$) distribution. If the estimated Var(X) is significantly larger than E(X), it is a clear sign that $X_1, X_2, \ldots, X_n$ are not identically distributed, and the simple Poisson distribution model is inadequate. This has been true for all the data we have tested, e.g., the administrator usually has many more counts for administrative actions. One could actually assign the Poisson parameter to be the single count for each user, but it would have extreme variability, and one cannot calculate a variance with a single data point.

Because a priori $X_i$s are not identically distributed and we only have a single data point for each user, we cannot estimate individual $\lambda_i$s from the data and have to use a more flexible model that can account for additional variability of the rate parameter.

A more appropriate model is one that considers the rate parameter of the Poisson distribution as a random variable itself to allow for distribution with a larger variance than that of the simple Poisson distribution. A Poisson distribution for which λ is a random variable is called a mixed Poisson distribution (MPD), and the distribution of λ is called the mixing distribution (MD).

To apply the MPD model to the count data, we assume that $\lambda_i$s are independent and identically distributed random variables with a Gamma(shape,scale) distribution. A Gamma function is commonly used as an MD because an MPD with a Gamma MD is a negative binomial distribution, and most other MDs do not yield a closed-form solution. In essence, this is a Bayesian approach with a Gamma prior for each $\lambda_i$ that is updated by the count data. The count data $X_1, X_2, \ldots, X_n$ can be used to estimate the parameters of the MPD, and the fitted MPD can be used as a model for detecting anomalous values in the training dataset.

The estimation of the MD parameters is obtained from the moment estimates for the data using the property of Poisson mixtures that relates the moments of the mixing and mixed distributions. The moments of the mixed Poisson distribution are the same as the moments of the mixing distribution about the origin: $E(X)=E(\lambda)$ and $E(X^2)=E(\lambda^2)+E(\lambda)$ and $Var(X)=E(\lambda)+Var(\lambda)$.

From these, the moment estimates of λ are $$E(\lambda)=E(X) \qquad (1.a)$$

$$Var(\lambda)=Var(X)-E(X) \qquad (1.b)$$

and the estimates for the shape and scale of the Gamma MD are obtained as:

$$scale=Var(\lambda)/E(\lambda) \qquad (2.a)$$

$$shape=E(\lambda)^2/Var(\lambda). \qquad (2.b)$$

The moment estimates of the shape and scale parameters of the Gamma MD are used to compute the parameters of the negative binomial distribution (NBD). The NBD gives the probability of the number of failures in a sequence of independent and identically distributed Bernoulli trials before a fixed number of successes, denoted as r, occurs. The two parameters of the NBD are estimated through the moment estimates of shape and scale as:

$$r=shape$$

$$p=1/(1+scale).$$

where p is the probability of success of the Bernoulli trial. The inverse of the NBD is used to compute the percentile threshold (θ) for detecting anomalous counts in the training data given the specified significance level α:

$$\theta=NBD^{-1}(1-\alpha).$$

If $X_i>\theta$, this is an anomaly with respect to the fitted model with the probability of error<α.

This MPD model is more accurate and does a better job incorporating the action count data than a simple Poisson distribution. However, if individual $\lambda_i$s do not follow a single MD, the resulting MPD may still be inadequate and have a very large variance that would mask true anomalies. This is especially important for building a model on data coming from a new application instance without any knowledge of what the distribution of user activities may look like.

Also, if the training data contain true anomalies, i.e., counts that have been generated by anomalous activity, these anomalies may bias the moment estimates of the model's parameters and result in the inability of the fitted model to distinguish between normal and anomalous counts.

Finding Potential Anomalies by Clustering

To overcome these challenges, the disclosed method first performs unsupervised clustering of the count data to form groups of similar data. Each group then is assumed to contain data that follow a MPD with a Gamma(shape, scale) MD, where the shape and scale may be different for each group.

Suspect anomalies are identified by clustering them as single-point and rare clusters, and are then verified by checking if they are anomalous with respect to the derived MPD models. If confirmed, the anomalies are labeled for removal from the training dataset and reported as training data anomalies.

The data clustering based on action counts is used to split a non-homogeneous group of data points that can be better described by a number of different models. The smaller groups or clusters are more homogeneous individually than the entire dataset. Depending on the type of clustering procedure and grouping criterion used for clustering, the content of individual clusters might be different. Two main forms of clustering exist: (1) distance-based clustering; and (2) density-based clustering. In distance-based clustering, the points in each cluster are closer, meaning the distance between them is smaller, in the same cluster, than to the points in the other clusters. In density-based clustering, the density of points within the same cluster is similar but different from the density of points bordering the clusters.

For count data the distance-based clustering is most appropriate and any appropriate distance-based clustering method could be used. However, these methods require user input, such as the threshold distance between similar points. In one embodiment, we use arbiter-based similarity clustering, which offers a number of advantageous properties that make it suitable for anomaly-detection applications with minimal need for supervision. (See U.S. Pat. No. 9,147,167, entitled "Similarity Analysis with Tri-Point Data Arbitration," by inventors Aleksey M. Urmanov and Anton A. Bougaev, filed on 9 Nov. 2012, which is hereby incorporated herein by reference.)

The arbiter-based similarity clustering does not require any parameters for explicitly or implicitly specifying the number of clusters or any cluster forming or cluster separation criteria. It splits the given dataset into clusters with the property that points in the same cluster are similar to each other with respect to the entire dataset and that points from different clusters are dissimilar. Similarity is determined by the other data points (called arbiters) voting on whether each pair of points is similar.

The use of non-parametric clustering allows for automated anomaly detection. For example, by performing clustering and identifying single point clusters, these single point clusters can be considered anomalies because they are single points that are not similar to any of the points in the dataset. Also, rare clusters, meaning clusters that contain very few data points compared to the majority of other clusters, may be treated as multi-point anomalies.

Given the training dataset $X_1, X_2, \ldots, X_n$, the clustering algorithm partitions the dataset into an optimal number of clusters, denoted k. For example, $C_1=\{1,2,5,8\}$
$C_2=\{4,7,\ldots\}$
$C_j=\{30,\ldots\}$
$C_k=\{9,44,5\}$ where each data point $X_i$ belongs only to one cluster $C_j$. In one variation, a data point can be assigned to more than one cluster. This is the case of overlapping clusters, which could be more realistic due to noise inherent in the data and approximating nature of the models. For clarity of explanation, we assume that each point is assigned to only one cluster. For each cluster, the similar points are assumed to be adequately described by a single model, for example, by an MPD with a Gamma MD with specific shape and scale. Each cluster will have different Gamma parameters MPD(shape$_c$, scale$_c$) where c=1, ..., k.

The models are created only for normal clusters, meaning the clusters with more than one data point or, optionally, with more than a certain percent of data points. The single-point clusters and the rare clusters are potential anomalies but need to be verified as anomalous by the MPD models of normal clusters before being reported as such.

We denote the set of normal clusters as CN and the set of single point and rare clusters as CR. For the CN normal clusters, we build MPD models and denote them as MPD$_j$. Given a specified level of admissible error $\alpha$, anomaly verification is performed by computing a threshold for each MPD model and then testing each point from the CR clusters for anomaly using the thresholds. To be a verified anomaly, a point must be considered an anomaly by all normal clusters, i.e. the count value must be larger than all |CN| thresholds $X_z > \theta_{j \in CN}$, wherein $X_z$ is from one of the CR clusters.

All verified anomalies in the training dataset are removed before the dataset is used for building per-user activity models.

The collection of all clusters CN and CR and the fitted |CN| MPD models with their parameters constitute a per-action activity model for action A.

Similarly, for non-count data types, other universal prior information can be used to design models to verify anomalies detected by the arbiter-based clustering. Note that arbiter-based clustering and prior driven models complement each other and form an anomaly-detection system. Without arbiter-based clustering, it is impossible to adequately fit simple distributional models. Flagging all single point and rare clusters as anomalies without additional anomaly verification would create an unacceptable number of false anomalies, thus substantially limiting the applicability of anomaly detection in practical situations. It is the synthesis of the two that allows for the detection of anomalies in the described context of software service usage activity modeling.

In the following example, we demonstrate this novel anomaly-detection method on a simulated dataset representing counts of an action performed by a group of users. The parameter responsible for modeling user activity patterns is a random variable itself so that no simple distributional model is adequate for representing the activity of all users in the group with regards to performing the action.

Simulated Example

Suppose we have 200 users of an application performing a single action. Suppose further that we have collected the number of times every user performed the action in a time period T, and that the mean number of times the action is performed is 8. As explained earlier, we expect each user to have their own activity pattern described by a simple Poisson distribution but with unknown (user-specific) rate parameters. We generate such data and compare its fit to the proposed MPD model and to a simple Poisson model with the rate parameter $\lambda$ fixed and set to $\lambda_{true}$=8.

To generate data for the simple Poisson model with the rate parameter $\lambda$ fixed, we pick 200 count values at random from the Poisson($\lambda_{true}$) distribution. To generate data for the Poisson distribution with user-specific rate parameters, we assume that the unknown rate parameter is a random variable that can be described by a probability distribution such as Gamma(shape$_{true}$, scale$_{true}$). For purposes of the example, set shape$_{true}$=8 (similar to $\lambda_{true}$) and scale$_{true}$=1. For each of the 200 users, we first select a value of $\lambda_i$ from the Gamma (shape$_{true}$, scale$_{true}$) distribution at random and then, using that $\lambda_i$ value, select a count from the Poisson($\lambda_i$) distribution at random.

We now have two datasets with 200 count values: one containing values of independent identically distributed random variables, and the other containing values of independent non-identically distributed random variables. The data generated from the simple Poisson distribution are illustrated in FIG. 4A, and the 200$\lambda$ values generated from the Gamma distribution are illustrated in FIG. 4B. Using the above $\lambda$s, the count values illustrated in FIG. 4C are generated from an MPD using the 200$\lambda$ values generated from the Gamma distribution.

Figure 4D:
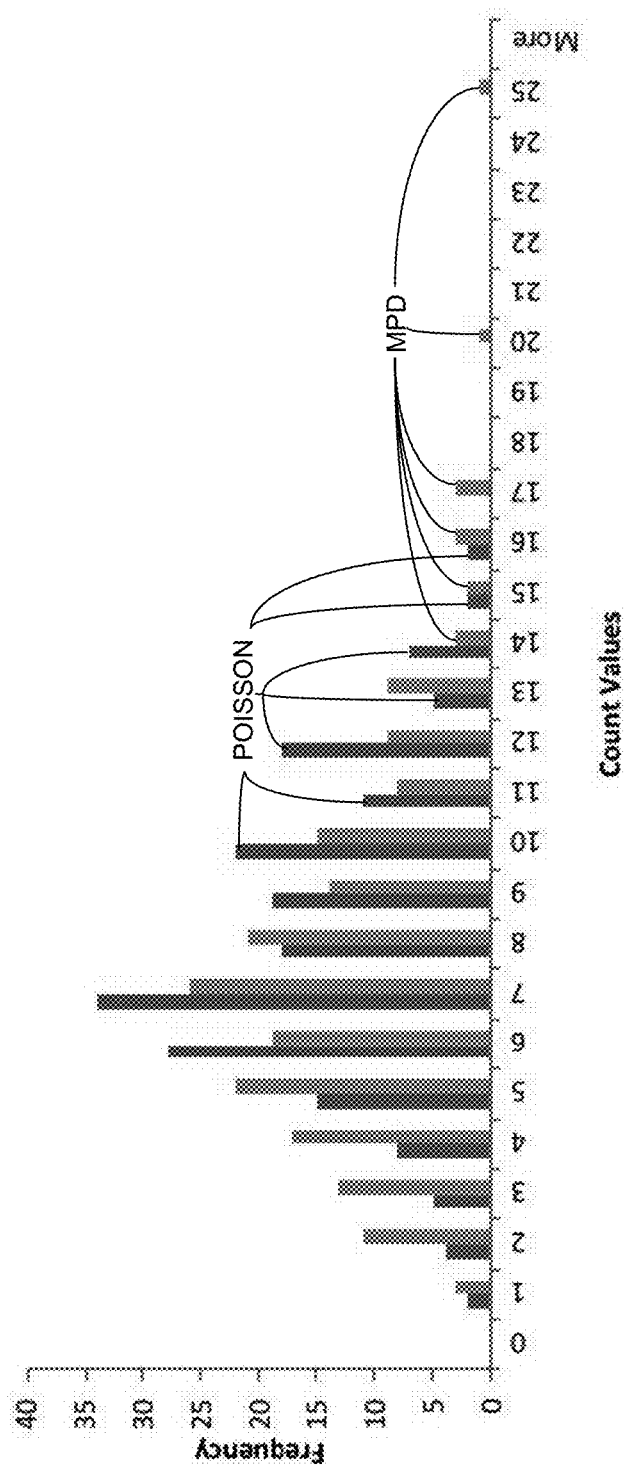
FIG. 4D presents a histogram of values generated using Poisson and missed Poisson distributions in accordance with the disclosed embodiments.

A comparison of the Poisson (counts1) and MPD (counts2) datasets is illustrated in the histogram that appears in FIG. 4D. When we plot the histograms of the two datasets, it is immediately clear that the variance of the differently distributed counts in the MPD is much larger than that of the identically distributed counts from the Poisson distribution. The MPD model has significantly more lower count values, and the right tail is much longer.

If we compute the sample means and variances for the two models using the generated counts1 and counts2 data, we obtain that: E(Poisson)=8.17, Var(Poisson)=9.38, E(MPD) =7.55 and Var(MPD)=15.02. Notice that the variance of the differently distributed counts is about two times the variance of the identically distributed counts, which clearly shows that a simple Poisson model will be inadequate for the differently distributed counts even for this mildly varied difference in user activity patterns.

Let's use the moment relationships between mixed and mixing distributions to estimate the parameters of the Gamma MD. First, we compute the moment estimates of $\lambda$ for counts2 data using equations (1a) and (1b), which are E($\lambda$)=7.55 and Var($\lambda$)=7.46. From the moment estimates of $\lambda$, using equations (2a) and (2b), the moment estimates of the parameters of the Gamma MD are E(shape)=7.64 and E(scale)=0.98, which are very close to the true values used to generate the counts2 dataset. Using the estimated values let's compare the 99% percentiles for the simple Poisson(E ($\lambda$)) and the MPD(E(shape), E(scale)). The threshold values are:

Simple Poisson Poisson(7.55) for $p$=0.99;$\theta$=15

Mixed Poisson MPD(7.64,0.98) for $p$=0.99;$\theta$=18.

Comparing how many points lie outside of the threshold on the counts2, we observe that for the simple Poisson model there are eight points outside of the threshold which is 4% of the data. For the MPD model, there are only two points outside of the threshold, which is 1% of the data. This demonstrates that the simple Poisson model is inadequate for modeling the counts coming from different Poisson distributions, and as a result of not accounting for additional variability in the data, the number of anomalies is much higher (4×) than the 1% specified. The MPD model is much more accurate and identified two potential anomalies, which is about 1% as specified.

Figure 5:
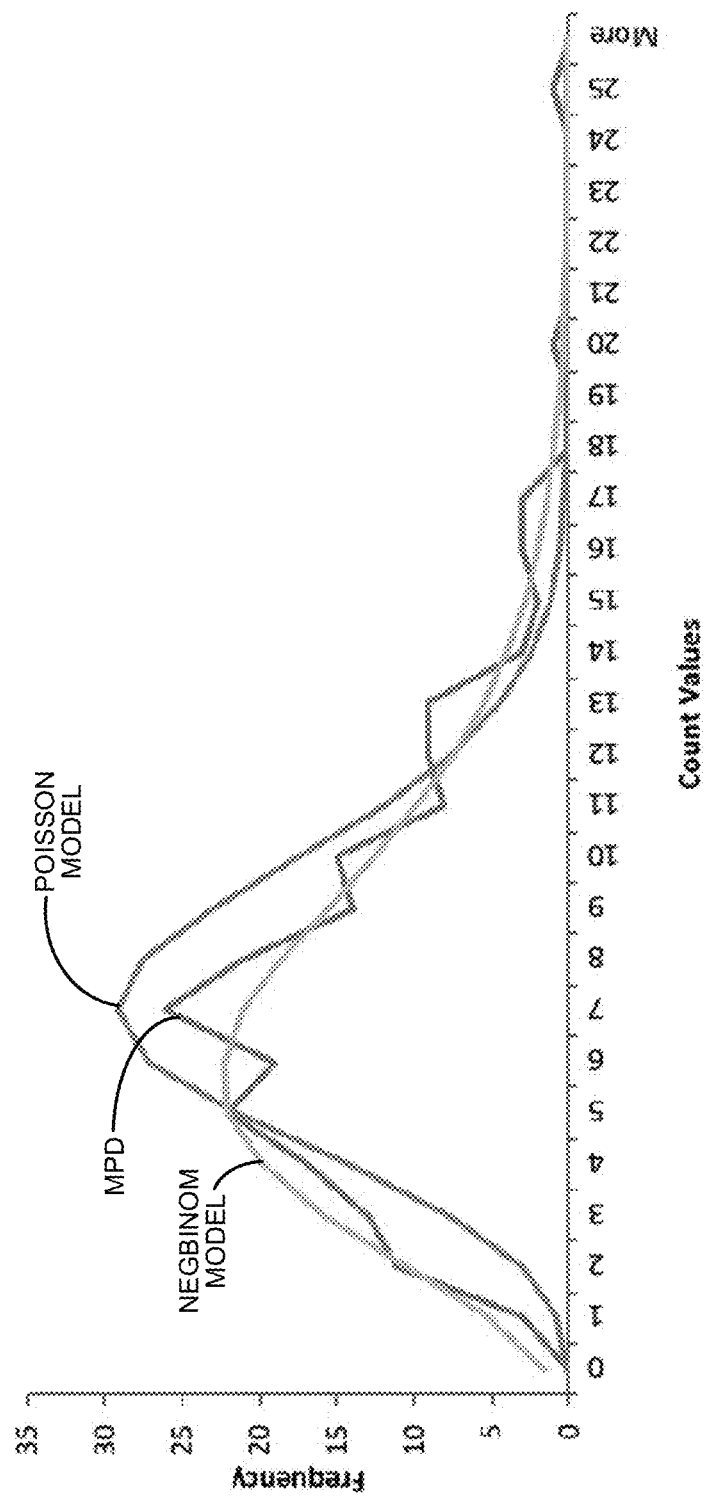
FIG. 5 presents a graph comparing Poisson and negative binomial models with MPD count values in accordance with the disclosed embodiments.

FIG. 5 shows a fit of the Poisson distribution and a negative binomial distribution to the counts2 data (recall that an MPD with a Gamma MD is a negative binomial distribution). We see that the simple Poisson distribution fails to adequately describe the low counts and the right tail of the data, overestimating the values around the mean. Hence, the MPD provides a practically adequate model for count data and, in combination with unsupervised clustering, offers a powerful tool for anomaly detection.

Processing Training Data

Figure 6:
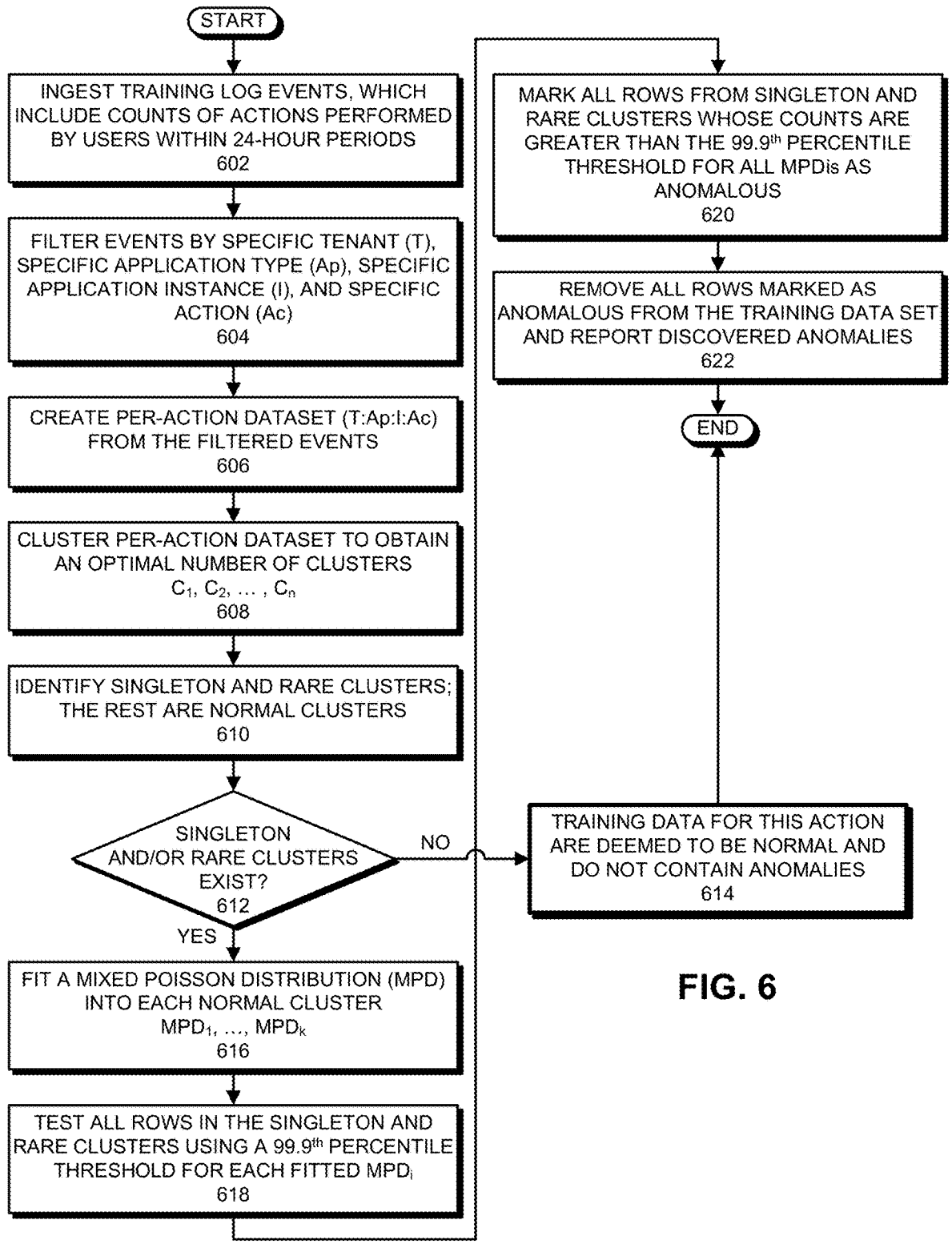
FIG. 6 presents a flow chart illustrating a process for removing anomalous user actions from training data in accordance with the disclosed embodiments.

FIG. 6 presents a flow chart illustrating a process for removing anomalous user actions from training data in accordance with the disclosed embodiments. First, the system ingests training log events, which include counts of actions performed by users within 24-hour periods (step 602). Next, the system filters events by specific tenant (T), specific application type (Ap), specific application instance (I) and specific action (Ac) (step 604). The system then creates a per-action dataset (T:Ap:I:Ac) from the filtered events (step 606). Next, the system clusters the per-action dataset to obtain an optimal number of clusters $C_1$, $C_2, \ldots, C_n$ (step 608).

The system then identifies singleton and rare clusters, where the rest of the clusters are referred to as "normal clusters" (step 610). Next, the system determines whether singleton and/or rare clusters exist (step 612). If not (NO at step 612), the training data for this action are deemed to be normal and do not contain anomalies (step 614) and the process completes. Otherwise, if singleton and/or rare clusters exist (YES at step 612), the system fits a mixed Poisson distribution (MPD) into each normal cluster $MPD_1, \ldots,$ $MPD_k$ (step 616). Next, the system tests all rows in the singleton and rare clusters using the $99.9^{th}$ percentile threshold for each fitted $MPD_i$ (step 618). The system then marks all rows from singleton and rare clusters whose counts are greater than the $99.9^{th}$ percentile threshold for all $MPD_i$s as anomalous (step 620). Finally, the system removes all rows marked as anomalous from the training dataset and reports discovered anomalies (step 622).

Detecting Anomalies

Figure 7:
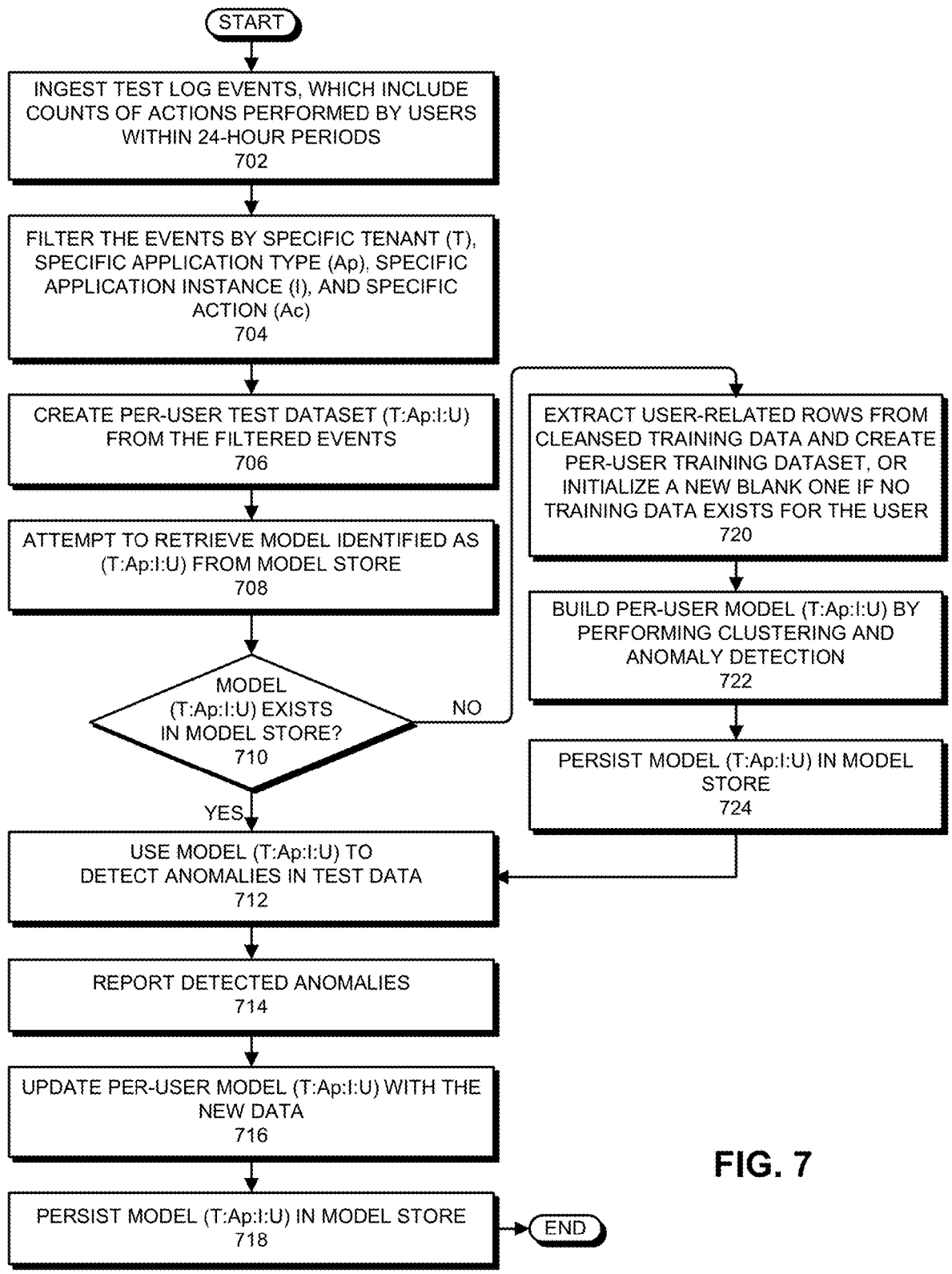
FIG. 7 presents a flow chart illustrating a process for detecting anomalous user actions based on processed training data in accordance with the disclosed embodiments.

FIG. 7 presents a flow chart illustrating a process for detecting anomalous user actions based on processed training data in accordance with the disclosed embodiments. First, the system ingests test log events, which include counts of actions performed by users within 24-hour periods (step 702). Next, the system filters events by specific tenant (T), specific application type (Ap), specific application instance (I) and specific action (Ac) (step 704). The system then creates a per-user dataset (T:Ap:I:U) from the filtered events (step 706). The system then attempts to retrieve a model identified as (T:Ap:I:U) from the model store (step 708). Next, the system determines whether the model (T:Ap:I:U) exists in the model store (step 710). If so (YES at step 710), the system proceeds to step 712. If not (NO at step 710), the system extracts user-related rows from the cleansed training data and creates a per-user dataset, or initializes a new blank one if no training data exists for the user (step 720). The system then builds a per-user model (T:Ap:I:U) by performing clustering and anomaly detection (step 722). The system then persists the model (T:Ap:I:U) in the model store (step 724).

Next, the system proceeds to step 712, where it uses the model (T:Ap:I:U) to detect anomalies in the test data (step 712). The system then reports the detected anomalies (step 714), and updates the per-user model with the new data (step 716). Finally, the system persists the model (T:Ap:I:U) in the model store (step 718).

High-Level Flow Chart

Figure 8:
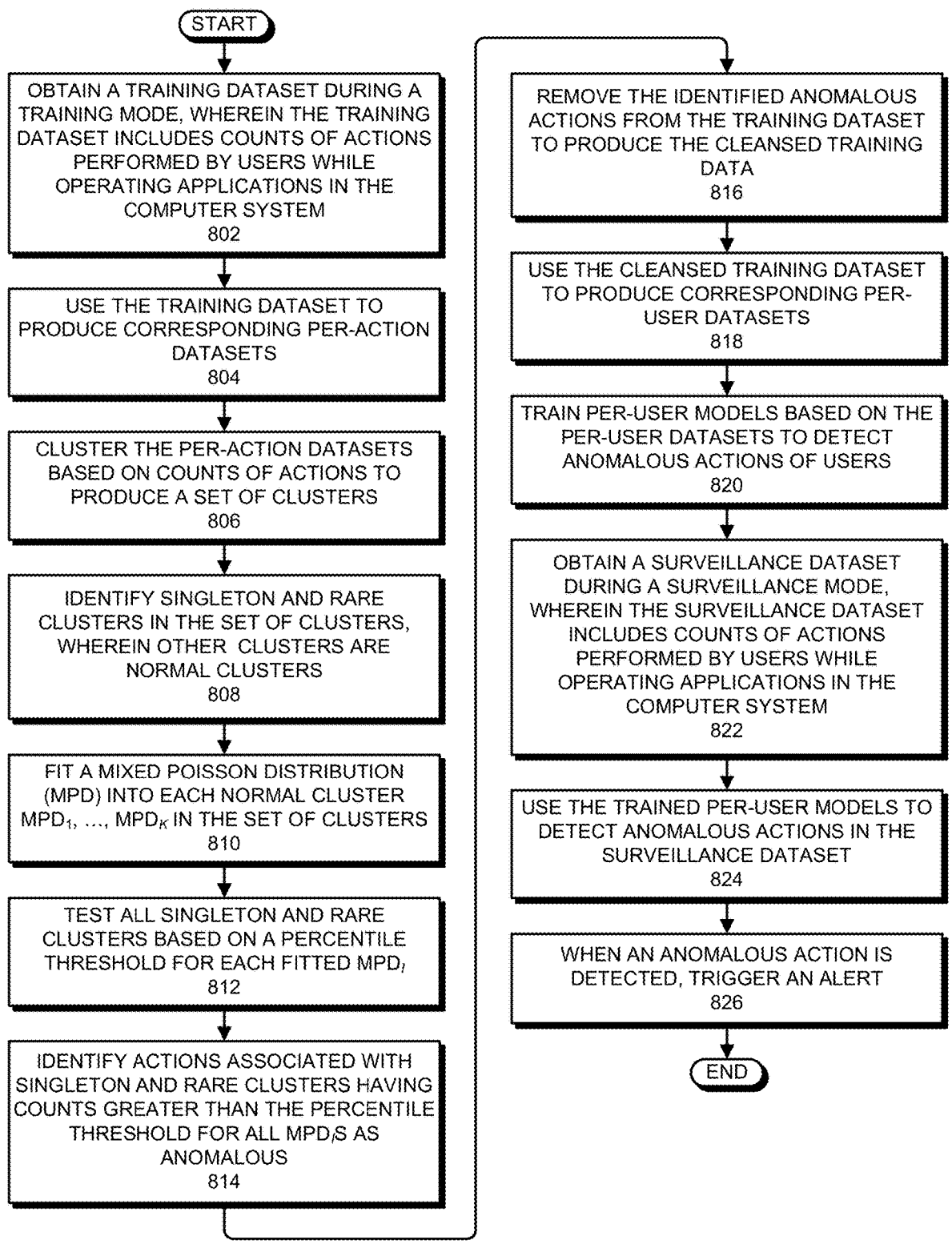
FIG. 8 presents a high-level flow chart illustrating a process for detecting anomalous user actions in accordance with the disclosed embodiments.

FIG. 8 presents a high-level flow chart illustrating a process for detecting anomalous actions of users while operating applications in a computer system in accordance with the disclosed embodiments. During operation, the system obtains a training dataset during a training mode, wherein the training dataset includes counts of actions performed by users while operating applications in the computer system (step 802). Next, the system uses the training dataset to produce corresponding per-action datasets (step 804). The system then clusters the per-action datasets based on counts of actions to produce a set of clusters (step 806). Next, the system identifies singleton and rare clusters in the set of clusters, wherein other clusters are normal clusters (step 808). Next, the system fits a mixed Poisson distribution (MPD) into each normal cluster $MPD_1, \ldots,$ $MPD_k$ in the set of clusters (step 810). The system then tests all singleton and rare clusters based on a percentile threshold for each fitted $MPD_i$ (step 812). Next, the system identifies actions associated with singleton and rare clusters having counts greater than the percentile threshold for all $MPD_i$s as anomalous (step 814). The system then removes the identified anomalous actions from the training dataset to produce the cleansed training data (step 816). Next, the system uses the cleansed training dataset to produce corresponding per-user datasets (step 818). The system then trains per-user models based on the per-user datasets to detect anomalous actions of users (step 820). Next, the system obtains a surveillance dataset during a surveillance mode, wherein the surveillance dataset includes counts of actions performed by users while operating applications in the computer system (step 822). The system then uses the trained per-user models to detect anomalous actions in the surveillance dataset (step 824). Finally, when an anomalous action is detected, the system triggers an alert (step 826).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for detecting anomalous actions of users while operating applications in a computer system, comprising:
    obtaining a training dataset during a training mode, wherein the training dataset includes counts of actions performed by users while operating applications in the computer system;
    using the training dataset to produce corresponding per-action datasets;
    cleansing the training dataset based on counts of actions in the per-action datasets to produce a cleansed training dataset;
    using the cleansed training dataset to produce corresponding per-user datasets;
    training per-user models based on the per-user datasets to detect anomalous actions of users;
    obtaining a surveillance dataset during a surveillance mode, wherein the surveillance dataset includes counts of actions performed by users while operating applications in the computer system;

using the trained per-user models to detect anomalous actions in the surveillance dataset; and when an anomalous action is detected, triggering an alert.

2. The method of claim 1, wherein cleansing the training dataset based on the counts of actions in the per-action datasets involves:
   clustering the per-action datasets based on counts of actions to produce a set of clusters;
   identifying singleton and rare clusters in the set of clusters, wherein other clusters in the set of clusters are normal clusters;
   fitting a mixed Poisson distribution (MPD) into each normal cluster $MPD_1, \ldots, MPD_k$ in the set of clusters;
   testing all singleton and rare clusters based on a percentile threshold for each fitted $MPD_i$;
   identifying actions associated with singleton and rare clusters having counts greater than the percentile threshold for all $MPD_i$s as anomalous; and
   removing the identified anomalous actions from the training dataset to produce the cleansed training data.

3. The method of claim 1, wherein when an anomalous action is detected, the method further comprises performing a remedial action, which can include one or more of the following:
   informing a system administrator about the anomaly and providing contextual information;
   scheduling execution of diagnostics and/or security scanning applications for affected parts of the computer system;
   suspending associated users and/or applications; and
   enforcing multi-factor authentication for associated users and/or applications.

4. The method of claim 1, wherein the computer system comprises a cloud-computing infrastructure, which hosts applications for various tenants.

5. The method of claim 4, wherein triggering the alert involves sending a notification to an associated tenant.

6. The method of claim 4, wherein the method is performed for a specific application instance and a specific tenant.

7. The method of claim 1, wherein obtaining the training data involves gathering and aggregating the training data from various logs within the computer system.

8. The method of claim 1, wherein the counts of actions comprise counts of actions over fixed time intervals.

9. A non-transitory, computer-readable storage medium storing instructions that when executed by a computer cause the computer to perform a method for detecting anomalous actions of users while operating applications in a computer system, the method comprising:
   obtaining a training dataset during a training mode, wherein the training dataset includes counts of actions performed by users while operating applications in the computer system;
   using the training dataset to produce corresponding per-action datasets;
   cleansing the training dataset based on counts of actions in the per-action datasets to produce a cleansed training dataset;
   using the cleansed training dataset to produce corresponding per-user datasets;
   training per-user models based on the per-user datasets to detect anomalous actions of users;
   obtaining a surveillance dataset during a surveillance mode, wherein the surveillance dataset includes counts of actions performed by users while operating applications in the computer system;
   using the trained per-user models to detect anomalous actions in the surveillance dataset; and
   when an anomalous action is detected, triggering an alert.

10. The non-transitory, computer-readable storage medium of claim 9, wherein cleansing the training dataset based on the counts of actions in the per-action datasets involves:
   clustering the per-action datasets based on counts of actions to produce a set of clusters;
   identifying singleton and rare clusters in the set of clusters, wherein other clusters in the set of clusters are normal clusters;
   fitting a mixed Poisson distribution (MPD) into each normal cluster $MPD_1, \ldots, MPD_k$ in the set of clusters;
   testing all singleton and rare clusters based on a percentile threshold for each fitted $MPD_i$;
   identifying actions associated with singleton and rare clusters having counts greater than the percentile threshold for all $MPD_i$s as anomalous; and
   removing the identified anomalous actions from the training dataset to produce the cleansed training data.

11. The non-transitory, computer-readable storage medium of claim 9, wherein when an anomalous action is detected, the method further comprises performing a remedial action, which can include one or more of the following:
   informing a system administrator about the anomaly and providing contextual information;
   scheduling execution of diagnostics and/or security scanning applications for affected parts of the computer system;
   modifying account access settings for associated users;
   suspending associated users and/or applications; and
   enforcing multi-factor authentication for associated users and/or applications.

12. The non-transitory, computer-readable storage medium of claim 9, wherein the computer system comprises a cloud-computing infrastructure, which hosts applications for various tenants.

13. The non-transitory, computer-readable storage medium of claim 12, wherein triggering the alert involves sending a notification to an associated tenant.

14. The non-transitory, computer-readable storage medium of claim 12, wherein the method is performed for a specific application instance and a specific tenant.

15. The non-transitory, computer-readable storage medium of claim 9, wherein obtaining the training data involves gathering and aggregating the training data from various logs within the computer system.

16. The non-transitory, computer-readable storage medium of claim 9, wherein the counts of actions comprise counts of actions over fixed time intervals.

17. A system that detects anomalous actions of users while operating applications in a computer system, comprising:
   at least one processor and at least one associated memory; and
   an anomaly-detection mechanism that executes on the at least one processor, wherein during operation, the anomaly-detection mechanism:
      obtains a training dataset during a training mode, wherein the training dataset includes counts of actions performed by users while operating applications in the computer system;
      uses the training dataset to produce corresponding per-action datasets;
      cleanses the training dataset based on counts of actions in the per-action datasets to produce a cleansed training dataset;

uses the cleansed training dataset to produce corresponding per-user datasets;

trains per-user models based on the per-user datasets to detect anomalous actions of users;

obtains a surveillance dataset during a surveillance mode, wherein the surveillance dataset includes counts of actions performed by users while operating applications in the computer system;

uses the trained per-user models to detect anomalous actions in the surveillance dataset; and when an anomalous action is detected, triggers an alert.

18. The system of claim 17, wherein while cleansing the training dataset based on the counts of actions in the per-action datasets, the anomaly-detection mechanism:

clusters the per-action datasets based on counts of actions to produce a set of clusters;

identifies singleton and rare clusters in the set of clusters, wherein other clusters in the set of clusters are normal clusters;

fits a mixed Poisson distribution (MPD) into each normal cluster $MPD_1, \ldots, MPD_k$ in the set of clusters;

tests all singleton and rare clusters based on a percentile threshold for each fitted $MPD_i$;

identifies actions associated with singleton and rare clusters having counts greater than the percentile threshold for all $MPD_i$s as anomalous; and removes the identified anomalous actions from the training dataset to produce the cleansed training data.

19. The system of claim 17, wherein when an anomalous action is detected, the anomaly-detection mechanism performs a remedial action, which can include one or more of the following:

informing a system administrator about the anomaly and providing contextual information;

scheduling execution of diagnostics and/or security scanning applications for affected parts of the computer system;

suspending associated users and/or applications; and enforcing multi-factor authentication for associated users and/or applications.

20. The system of claim 17, wherein the computer system comprises a cloud-computing infrastructure, which hosts applications for various tenants.

* * * * *